(No Model.)

J. WALRATH.
TRACTION ENGINE WHEEL.

No. 268,058. Patented Nov. 28, 1882.

Witnesses.
Eudy F. Walker
A. M. Foug.

Inventor.
Jesse Walrath
by his attorney

UNITED STATES PATENT OFFICE.

JESSE WALRATH, OF RACINE, WISCONSIN.

TRACTION-ENGINE WHEEL.

SPECIFICATION forming part of Letters Patent No. 268,058, dated November 28, 1882.

Application filed August 1, 1882. (No model.)

*To all whom it may concern:*

Be it known that I, JESSE WALRATH, a citizen of the United States, residing at Racine, in the county of Racine and State of Wisconsin, have invented certain new and useful Improvements in Portable and Traction Engine Wheels; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to metallic wheel-hubs provided with a removable thimble or bushing.

My improvement consists in securing the bushing by means of a transverse key locked by a set-screw, as will be fully described in the ensuing description, and specifically pointed out in the claim at the close of this specification.

Figure 1:
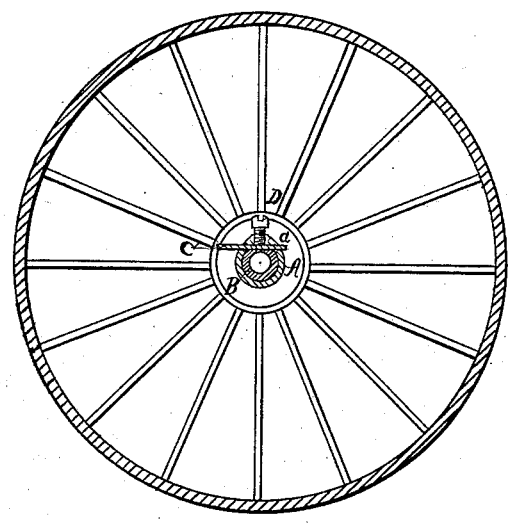
Figure 3:
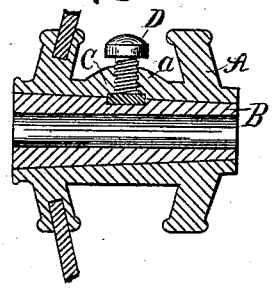
Figure 2:
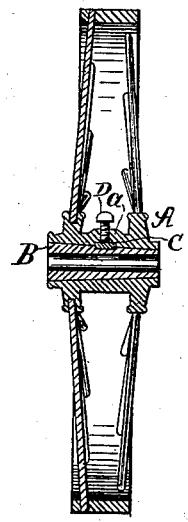

In the annexed drawings, Figure 1 is a section transverse of the axis of a wheel embodying my invention. Fig. 2 is an axial section of the same. Fig. 3 is an axial section of the hub, with its bushing and fastening devices, drawn on a larger scale.

The same letters of reference indicate identical parts in all the figures.

I have shown my invention as applied to a traction-engine wheel constructed entirely of metal. The hub A is bored taperingly and fitted with a tapering bushing, B. On one side, and about midway of its length, the hub A is constructed with a boss, a, for the purpose of strengthening it at that point sufficiently to admit of forming a transverse flat hole through it for the reception of the transverse key C, and a radial tapped hole for the reception of the set-screw D. A transverse recess is also formed in the bushing B to register with the transverse key-hole of the hub A, and the key C is made of such width and thickness as to fit snugly in the opening thus formed between the hub and bushing. The key is made slightly tapering, so that it may wedge in the opening on being driven home. After the key has been driven home the set-screw D is tightly screwed down upon it to prevent the accidental working out of the key.

I am aware that it is not new to provide a wheel-hub with a removable bushing, and do not broadly claim a wheel so constructed. The object of my invention is to so apply a thimble or bushing that it may be readily removed and another one substituted for it by an unskilled farm-hand, and that when once applied it shall not be liable to work loose under rough treatment, to which it is necessarily subjected on traction-engines. These conditions are fully met by my mode of securing the removable bushing.

Having thus described my invention, what I claim is—

The combination, substantially as before set forth, of the wheel-hub, the removable bushing, the transverse key, and the set-screw.

In testimony whereof I affix my signature in presence of two witnesses.

JESSE WALRATH.

Witnesses:
CHARLES H. LEE,
W. B. DYER.